July 29, 1952     D. E. HOWE     2,605,061
CONSTANT TENSION DEVICE
Filed May 13, 1948
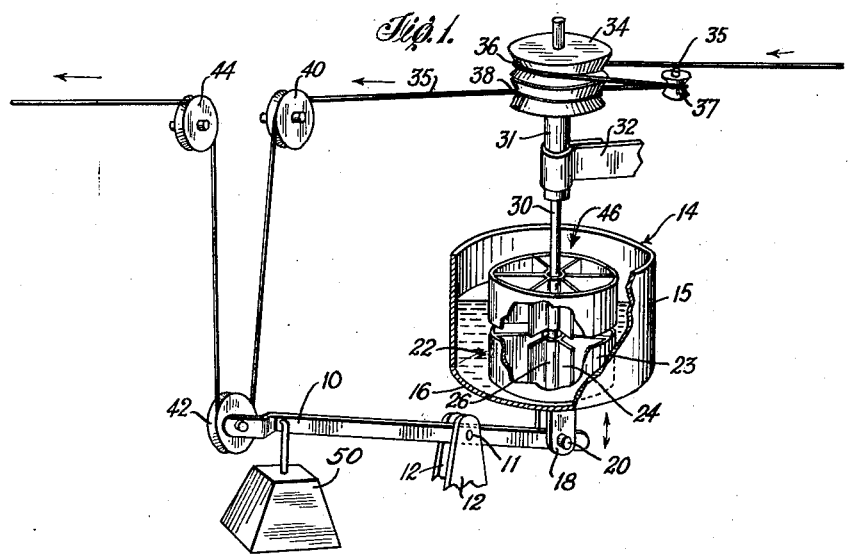
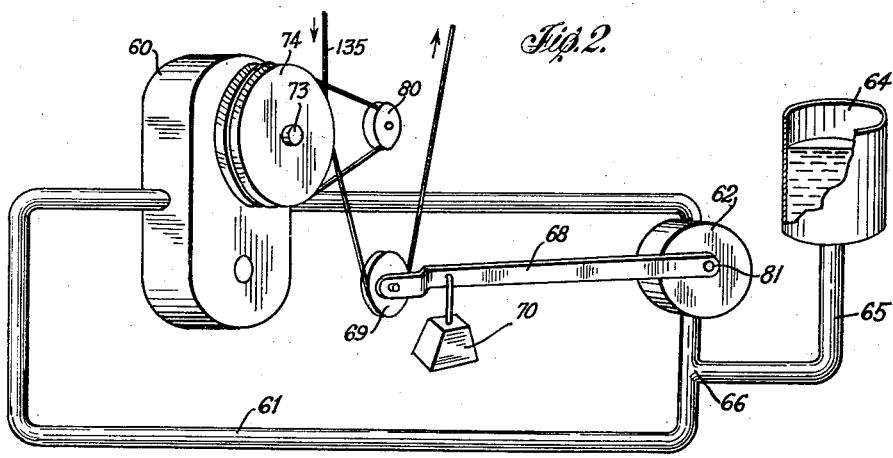
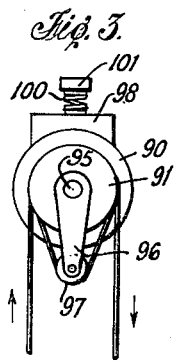
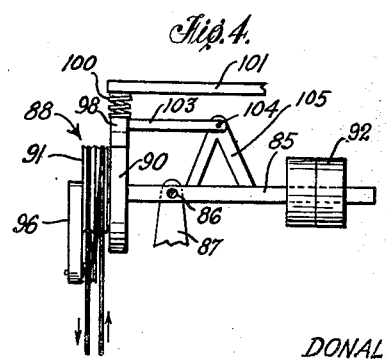
Inventor
DONALD E. HOWE
By *Clyd Frye*
Attorneys Patented July 29, 1952

2,605,061

UNITED STATES PATENT OFFICE 2,605,061

CONSTANT TENSION DEVICE

Donald E. Howe, Akron, Ohio, assignor to The Firestone Tire & Rubber Company, Akron, Ohio, a corporation of Ohio Application May 13, 1948, Serial No. 26,791

2 Claims. (Cl. 242—155)

A primary object of the invention resides in the provision of an improved apparatus for maintaining a constant tension on portions of a continuously moving thread or cord-like element.

The invention is particularly adapted for use in maintaining a constant tension on cotton cords, such as are utilized in the manufacture of tires and the like, for stretching or calendering, but it is understood that the invention is not limited to such use.

A further object of the invention is generally to improve the construction and operation of mechanisms adapted to maintain cord-like elements under constant tension during a stretching operation with particular reference to the application thereof within the textile field. Cotton cord as currently employed in tire construction is normally subjected to a stretching operation after being twisted. To permit the use of relatively simple apparatus, a constant percent elongation is commonly applied, although stretch under a constant load results in more uniform physical properties such as residual stretch and tensile strength.

In the drawings:

Fig. 1 is a view in perspective of one form of the apparatus,

Fig. 2 is a view in perspective of another form of the apparatus,

Fig. 3 is an end elevational view of a third form of the apparatus, and

Fig. 4 is a side elevational view of the device of Fig. 3.

Referring to the drawings, Fig. 1 discloses a constant load or tension device representing one adaptation of the invention. The device comprises a lever arm 10, pivoted at 11 to a pair of stationary brackets 12. One end of lever arm 10 provides pull for a cylindrical receptacle 14, consisting of a side wall 15, a closed bottom wall 16 and an upper end open to the atmosphere. A bracket comprising a pair of bifurcated arms 18 is fixed to bottom wall 16 to depend therefrom for pivotal engagement through pintle bolt 20 with arm 10.

Receptacle 14 has concentrically disposed therein a stationary vane assembly 22 consisting of a cylinder 23 and a plurality of radial arms 24 extending from a tubular hub 26 outwardly to cylinder 22. The lower end of cylinder 22 may contiguously engage the inner surface of bottom wall 16. A shaft 30 is journalled at 31 to a fixed bracket 32. The upper end of shaft 30 carries thread pulley 34 in pressed fit or keyed relation thereto. Cord 35, being processed, partially surrounds upper groove 36 in double pulley 34, passes around an idler pulley 37 and then makes one complete turn around the lower groove 38 of pulley 34. The cord is thus in non-slip engagement with pulley 34. Upon leaving pulley 34, the cord moves over a pulley 40 and then down and around pulley 42 rotatably mounted at the left end of lever 10, thence upward and over pulley 44 and on to a subsequent winding or processing stage.

The lower end of shaft 30 carries a vane assembly 46 which rotates therewith, assembly 46 preferably being of the same diameter as the previously described fixed vane assembly. Shaft 30 extends through vane assembly 46 and into hub 26 of the fixed vane assembly to retain said assemblies concentrically aligned while permitting axial movement therebetween. Vane assembly 46 might have the same number of vanes as the lower fixed assembly if desired. Provision of a weight 50, hung from lever 10 at a suitable position in respect to lever 42 as determined by the magnitude of the weight and the amount of tension to be applied, completes the assembly except for the addition of suitable fluid within receptacle 14 sufficient to completely immerse the lower vane assembly and at least partially immerse the upper vane assembly. The operation of the device is evident from the drawing and may be briefly outlined as follows. Cord 35, being threaded, is moved about pulleys 34, 37, 34, 40, 42 and 44 by the application of suitable pulling force applied to the cord at a point to the left of pulley 44 in the direction of the arrow. While pulleys 37, 40, 42 and 44 are mounted for free rotation in respect to their various mounting shafts which are fixed in a manner not shown, pulley 34 rotates in respect to journal 31 but is fixed in respect to shaft 30. The tension engagement of cord 35 in respect to the grooves 36 and 38 of pulley 34 imparts sufficient frictional engagement to prevent slippage of the cord 35 in grooves 36 and 38 of pulley 34, hence rate of rotation of upper vane assembly 46 is a function of the rate of cord movement. The degree of tension applied to cord 35 determines the relative position of pivoted lever 10, through pulley 42, since variation in the magnitude of applied tension, working against weight 50 (as partially balanced by the dead weight of receptacle 14 and its contents) determines that position. Rotation of upper vane assembly 46 in response to cord movement effects a fluid drag between the juxtaposed vane assembly which varies in an inverse proportion to the axial distance therebetween. It is radially seen that a sudden increase of applied pulling force to the left of pulley 44 will result in upward movement of pulley 42 with the result of pivoting movements of lever 10 in a direction to lower receptacle 14 and increase the axial distance between the vane assembly to decrease the hydraulic drag on the cord which is imparted by pulley 34. Conversely, a decrease in the magnitude of the pulling force results in the lowering of pulley 42 with an attendant pivotal movement of lever 10 in the direction to move receptacle in an upward direction and decrease the axial distance between the vane assemblies with resultant increase in the hydraulic drag imparted to the cord through pulley 34.

An alternate adaptation of the invention is disclosed in Fig. 2, wherein hydraulic drag is automatically applied in varying degrees to the thread being processed by a gear pump 60. Pump 60 has its inlet and outlet connected in fluid sealing relation with a tubular conduit 61 to provide a fluid circulating system controllable as to fluid flow therein by a suitable valve 62. The fluid system is gravity fed from a reserve tank 64 leading to a conduit 65 which in turn leads into conduit 61 at 66. Valve 62 is provided with a radially extended lever arm 68 carrying a pulley 69 at the outer end thereof and a weight 70 at a suitable point intermediate valve 62 and pulley 69. The gear pump rotor shaft 73 carries a pulley 74 for rotation therewith. Thread 135, to be processed, is fed in the arrow direction around double grooved pulley 74, thence to idler pulley 80, and back around pulley 74 and then downwardly to partially encircle pulley 69 and upwardly in the arrow direction. The tension force is applied in the direction of the upwardly extending arrow at a point not shown. In operation, the device works in a manner similar to the structure of Fig. 1, with the exception that weight 70 is not partially counter-balanced. Pulley 74 acts as the gear pump drive and in this manner its function is similar to pulley 34 of the Fig. 1 adaptation. Thread 135 drives pulley 74 without slippage therebetween as the thread substantially encircles the pulley twice prior to its partial encirclement of the lever pulley 69. The fluid drag imparted to the thread by gear pump 60 is a function of the setting of valve 62, in the same manner that the fluid drag imparted by pulley 34 in the first adaptation was the function of the position of lever arm 10 as it pivoted in respect to its pintle 11. Increase in the applied tensioning force applied to thread 135 in the upward arrow direction results in an upward movement of pulley 69 with a corresponding pivoting of lever 68 about its fulcrum 81 to increase the opening of valve 62 and thereby decrease the flow resistance in the system against which gear pump 60 must work. A corresponding decrease in the applied tension-pressure is accomplished by a lowering of pulley 69 and pivoting of lever 68 in a downward direction resulting in a movement of valve 62 toward its closed position, increasing the flow resistance of the circuit and thereby increasing the fluid drag as imparted to the cord by pulley 74.

A still further adaptation of the invention is illustrated in Figs. 3 and 4 wherein a lever 85, pivoted at 86 to a bracket 87, is counter-balanced by reason of a pulley assembly 88 being fixed to one arm thereof and adjustable weights 92 mounted on the other arm thereof. Pulley assembly 88 includes a brake drum 90 and a thread-receiving pulley 91 mounted as a unit for rotation on a shaft extension of lever 85, as shown at 95, Fig. 3. A depending arm 96 is fixed to the shaft extension 95 at the free end thereof to provide offset anchorage for idler pulley 97. A brake shoe 98 functionally engages the portion of drum 90 under the urge of compression spring 100 confined between the brake shoe and bracket 101. Shoe 98 is carried by lever 103 pivoted at 104 to a standard 105 carried by the weight lever 85.

In operation, the device of Figs. 3 and 4 resembles Fig. 1 with the exception that a frictional resistance drag replaces the hydraulic drag of Fig. 1 device. Variations in the tensioning force, which in this instance is applied in the downward direction as shown by the arrows, result in variations in frictional resistances between drum 90 and shoe 98 as lever 85 pivots about fulcrum 86 in response to such pressure variations. Weights 92 through adjustability longitudinally of the lever arm 85, provide a convenient means for introducing the correct equilibrium between the load and the tension for a given thread, hence spring 100 need not be provided with adjusting means.

The preferred embodiments of the invention are above described for the purpose of illustration rather than limitation, it being understood that further structural modifications may freely be resorted to without departure from the spirit and scope of the invention which is limited only by the claims appendant hereto.

What is claimed is:

1. A device for imparting a constant tension to continuously moving material, comprising means to apply a lateral force to said moving material, a pulley positioned in advance of said first means over which said material passes, a brake adapted to apply a restraining force to said pulley comprising a container containing a liquid, a vaned rotor part immersed in said liquid and connected to and rotatable with said pulley, a vaned stator part immersed in said liquid and connected to said means, said stator part being movable toward and away from said rotor by said means whereby to exert a variable restraining force on said rotor and said pulley.

2. A device for imparting a constant tension to continuously moving material comprising a pulley attached to one end of a lever and taking a position laterally offset from the line of travel of said material means to urge said pulley away from said line of travel, a second pulley positioned in advance of said first pulley over which said material passes, a brake adapted to apply a restraining force to said second pulley comprising a container containing a liquid, a vaned rotor part immersed in said liquid and connected to and rotatable with said second pulley, a vaned stator part immersed in said liquid and connected to the other end of said lever opposite said first pulley and movable toward and away from said rotor in accordance with the position taken by said lever and first pulley to exert a variable restraining force upon said rotor and second pulley.

DONALD E. HOWE.

REFERENCES CITED

The following references are of record in the file of this patent:

UNITED STATES PATENTS

| Number | Name | Date |
|---|---|---|
| 49,479 | Pomeroy | Aug. 15, 1865 |
| 259,789 | Anthony | June 20, 1882 |
| 701,118 | Wood | May 27, 1902 |
| 1,652,299 | Carpenter | Dec. 13, 1927 |
| 2,098,422 | Keen et al. | Nov. 9, 1937 |
| 2,419,372 | Schneider | Apr. 22, 1947 |

FOREIGN PATENTS

| Number | Country | Date |
|---|---|---|
| 586,079 | France | Dec. 22, 1924 |